REVERSIBLE SHIFT REGISTER

Filed Sept. 4, 1956 4 Sheets-Sheet 1

INVENTOR.
GENUNG L. CLAPPER

BY

Dewey J. Cunningham

ATTORNEY 2,842,682

REVERSIBLE SHIFT REGISTER

Genung L. Clapper, Vestal, N. Y., assignor to International Business Machines Corporation, New York, N. Y., a corporation of New York Application September 4, 1956, Serial No. 607,667

10 Claims. (Cl. 307—88.5)

The present invention relates to a new and improved signal translating apparatus, and particularly to a storage register of the shifting or stepping type.

The use of shift registers in computing apparatus is quite common. They normally comprise a plurality of stages, each stage comprising a binary trigger. As is well known, a trigger of this type is capable of being in either of two stable states. In one state the trigger is said to be Off and considered to have a binary "0" stored therein, while in the other state, it is said to be On and considered to have a binary "1" stored therein. The input to the shift register may be either in parallel fashion, in which case all of the triggers are entered simultaneously, or in serial fashion, in which case the input information enters the first stage digit by digit and is progressively shifted to the succeeding stages each digit entry time. The manner in which a binary "1" in a stage during one digit time is shifted to the next stage during the next digit time is based upon the fact that a "carry" signal may be obtained from a stage when it goes from an On condition to an Off condition. A shifting sync signal is applied to each stage of the shift register at the same frequency as the digits enter the register. This shifting sync signal is used to turn every stage Off which is On before the sync signal occurs. Thus, the "carry" signal from one stage may be used to turn the next stage On following the occurrence of the shifting sync signal. This is usually accomplished by slightly delaying the "carry" signal until the shifting sync signal disappears.

The disadvantage of the above type of shift register is that every stage must be turned Off during the shifting signal. Thereafter, the "carry" signal from a particular stage is fed to the stage following it. It will be seen that where each of a string of digits has a binary value of "1," each stage will be going On and Off every digit time. This requires that the bistable elements operate at frequencies much higher than the shifting frequency. That is, the element must be capable of turning Off and then On in only a fraction of the normal shifting period.

Another type of shift register utilizes steering circuits to overcome the difficulties mentioned above by connecting each output from the two sides of one stage to serve as inputs to opposite sides of the next stage. Thus, when a shifting sync pulse is also applied to each side of said next stage, it will place said next stage in the same condition as said one stage. If said one stage has a binary value of "1" stored therein prior to the shift sync signal, and the said next stage has a binary value of "0" stored therein, when the sync signal occurs therein there will be produced an input to only one side of the said next stage, this input being steered to the side which can serve to turn the said stage On. If the said one stage had been Off and the said next stage On, prior to the occurrence of the sync signal, then the application of the shifting sync signal would be to the side of the said next stage which would turn that stage Off.

One of the difficulties encountered with a device such as is described above is that if a particular stage is On, for example, and the preceding stage is also On, the sync pulse will be allowed to still attempt to turn a trigger On in spite of the fact that it is already On. There are circumstances where the application of a pulse to a trigger to turn it On or Off, where the trigger is already in the condition which the input signal is attempting to place it, sometimes results in the trigger being changed to the opposite state in error. This may be caused by virtue of the fact that the inputs to a trigger are normally capacity coupled. Thus, if the leading edge of a negative going pulse is being used to turn the trigger On the trailing edge should not affect the trigger. However, the output of the capacitor reflects a positive going pulse following the trailing edge. This positive going pulse should not be able to turn the trigger to the opposite condition but such action sometimes occurs as a result of voltage variations, spurious noise signals, etc. The effect of the aforementioned random variations may increase the amplitude of the positive going trailing edge of the pulse to the point where conduction will be established in the cut off triode which will change the state of the trigger from On to Off, in the present example. Of course, a similar action occurs in attempting to turn a trigger Off that is already Off.

In application Serial No. 607,666 filed September 4, 1956, by Genung L. Clapper, there is described a shift register in which a three way switch is placed in the input circuit to each side of each trigger making up a stage. Each switch receives a signal representing the condition of the present stage, a signal representing the condition of a preceding stage, and a shift signal. Unless all three signals to a particular input circuit indicate that a change of state should take place, no input signal will be received by the trigger. However, one of the difficulties with the circuit described in this application is that it uses standard emitter to base cross-coupling arrangements used in a number of triggers which employ transistors. A disadvantage of this circuit is the fact that its frequency response is limited due to the minority carrier storage effect which appears to be most noticeable in the grounded collector configuration employed in the trigger. Thus, the circuit may have a best operating frequency of around 250 kc.

The present invention has the advantage of such prior art devices but overcomes the difficulties experienced therein and provides a shift register capable of high speed operation. With slight modification, the register of this invention is capable of being used as a reversible shift register. That is, information may be fed into the register at either end thereof and shifted in a forward or reverse direction. In addition, this shift register is capable of having information entered in parallel into it. This type of entry may be termed "side entry."

Briefly, the present invention comprises a plurality of capacity coupled triggers arranged in cascade. Each trigger comprises a pair of transistors, one of the transistors being connected in a modified grounded base configuration and the other being connected in a grounded collector configuration. Biasing connections are provided from each of the transistors to the other to maintain a particular stable state of the trigger. One side of the capacitor coupling two stages is connected to a first sync line while the other side of the capacitor is connected to a second sync line. The arrangement is such that the pulses of the first and second sync lines are synchronized with one another but of different polarity. Between sync pulses, the capacitor looks back into the previous stage and will be charged negatively if the previous stage is On. However, if the preceding stage is Off, very charge will appear across the capacitor. If the capacitor is charged when the sync pulses are produced, one of the sync pulses will cause an input signal to be applied through the capacitor to the next stage. If the next stage is already On, it stays that way. However, if the said next stage was Off, the input signal will turn the stage On. In the event the preceding stage was Off, the capacitor is not charged negatively between sync pulses and when the next sync pulses occur, the other of the said sync pulses supplies a signal to the next stage to turn it Off, unless it is already Off. In the event it is already Off, no input signal is produced. In the embodiment allowing either forward or reverse shifting of information in the register, an additional capacitor and sync line is used. This additional capacitor is connected to one of the syncs previously mentioned as well as a reverse sync, the other of the syncs previously mentioned being used as the forward sync in the manner previously disclosed. The forward and reverse syncs are used only when it is desired to shift the information in the register in forward or reverse directions, respectively.

Accordingly, it is an object of this invention to provide a new and improved signal translating apparatus.

Another object of the present invention is to produce a new and improved high speed shift register.

A further object of the present invention is to produce a shift register comprising a plurality of triggers, the individual state of a trigger being changed only when the condition is required to be changed.

A still further object of the present invention is to provide a new and improved shift register in which information may be entered serially at either end of the register or in parallel by side entry, the arrangement being such that the information in the register may be shifted in either a forward or a reverse direction.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference numerals represent similar parts throughout the several views.

Figure 1:
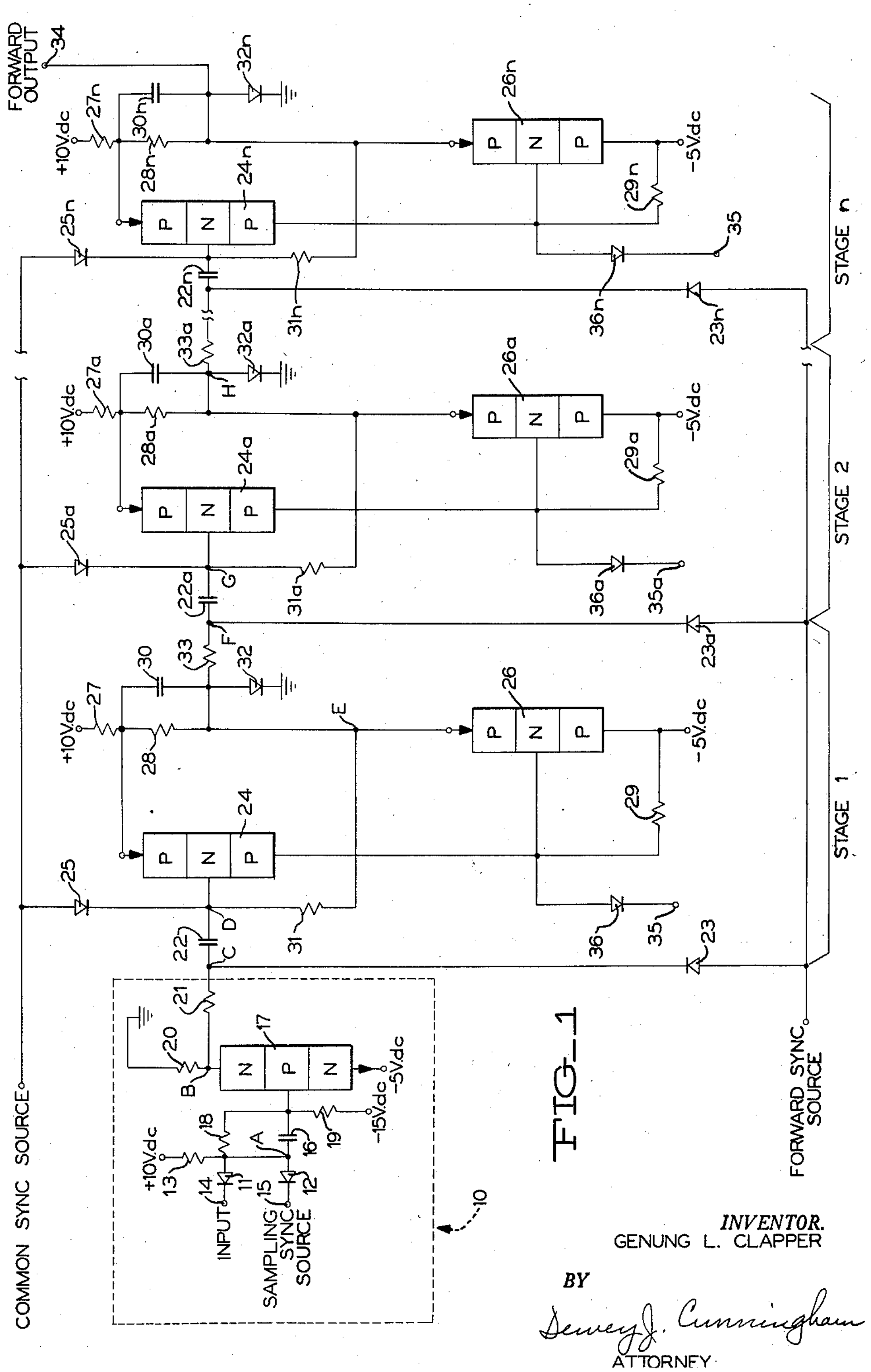
Fig. 1 shows a schematic diagram of a first form of the present invention.

Referring now to Fig. 1, there is illustrated an input circuit 10 which serves as the input to a register comprisin a number of stages herein labeled Stage 1, Stage 2, and Stage *n*. The input circuit includes a switch comprising diodes 11 and 12 and a resistor 13. The plates of the two diodes are commoned and connected to one end of resistor 13, the other end of the resistor being connected to a positive source of D. C. potential. The Input signal is adapted to be supplied to terminal 14 which is connected to the cathode of diode 11. The Sampling Sync signal is adapted to be supplied to terminal 15 which is connected to the cathode of diode 12. The arrangement is such that if relatively positive signals are supplied to each of the terminals 14 and 15, a relatively positive voltage will appear at point A. The voltage appearing at point A is coupled by way of a capacitor 16 to the base of an NPN junction type transistor 17. The convention used in the drawings in illustrating the various electrodes of transistors is that the emitter electrode of an NPN transistor is shown in the form of an arrow pointing away from the lower N-type region. The collector electrode is connected to the upper N-type region and the base electrode is connected to the P-type region. For PNP transistors, the emitter electrode is in the form of an arrow pointing toward the upper P-type region. The collector electrode is connected to the lower P-type region and the base electrode is connected to the N-type region.

The base of transistor 17 is connected to a point intermediate resistors 18 and 19. These resistors, along with the resistor 13, form a voltage divider between a positive source of D. C. potential connected to the upper end of resistor 13 and a negative source of D. C. potential connected to the lower end of resistor 19. Transistor 17 is connected in a grounded emitter configuration with its emitter connected to a negative source of D. C. potential and its collector connected through a resistor 20 to ground. The arrangement is such that when a coincidence of relatively positive voltages appear at terminals 14 and 15, a positive going voltage is applied to the base of transistor 17, thereby causing the base voltage to rise above the emitter voltage and allowing transistor 17 to go into conduction. When transistor 17 goes into conduction, the collector voltage at point B drops from approximately ground to approximately −5 volts. The collector of transistor 17 is connected by way of a resistor 21 to a point C which connects to one side of a capictor 22, the other side of said capacitor being connected to a point D.

Since the first embodiment is utilized only for shifting in a forward direction, the shifting sync is labeled Forward Sync and is applied by way of a diode 23 to one side of a capacitor 22 at point C. The sync labeled Common Sync, which is precisely out of phase with the Forward Sync, is connected to the other side of capacitor 22 at point D by way of a diode 25. As shown in the drawings, Stage 1 of the shift register includes the capacitor 22 and the diodes 23 and 25. The side of capacitor 22 connected to point D is also connected to the base electrode of a PNP junction type transistor 24. The last-mentioned transistor and a PNP junction type transistor 26, form the trigger of the first stage. Transistor 24 has its emitter electrode connected to a point intermediate resistors 27 and 28, the upper end of resistor 27 being connected to a positive souce of D. C. potential and the lower end of resistor 28 being connected to the emitter electrode of transistor 26. The arrangement is such that Stage 1 is considered to be Off when transistor 24 is conducting and transistor 26 is not conducting. Under these circumstances, the collector voltage of transistor 24 is sufficiently positive to bias transistor 26 out of conduction. However, should a positive going voltage appear at the base of transistor 24, transistor 24 would be placed out of conduction and its collector would drop toward the collector potential of transistor 26 by way of resistor 29. It will be seen that the collector of transistor 24 is connected directly to the base of transistor 26. As transistor 24 goes out of conduction, a negative going voltage is applied to the base electrode of transistor 26 and causes transistor 26 to go into conduction. When this occurs, the emitter electrode voltage of transistor 26 drops toward the collector voltage and causes the emitter electrode of transistor 24 to be biased in a manner to maintain transistor 24 out of conduction. A high frequency bypass capacitor 30 is arranged in parallel with resistor 28 and serves to speed up the drop in voltage at the emitter of transistor 24.

The emitter of transistor 26 is connected by way of a resistor 31 to the base of transistor 24. The arrangement is such that when the emitter of transistor 26 begins going negatively, a discharge path for capacitor 22 is afforded through resistor 31. This action allows the base of transistor 24 to return sufficiently negative so that when it is desired to turn this particular stage Off by causing transistor 24 to go back into conduction, the base voltage will be at the proper potential for allowing such action to take place. The emitter voltage of transistor 26 is clamped by way of a diode 32 so that it cannot go above ground. Of course, when transistor 26 goes into conduction, the emitter voltage will approach the collector voltage. Thus, the voltage swing at the emitter of transistor 26 is from ground to —5 volts. The emitter output is supplied to Stage 2 of the shift register by way of resistor 33 which is connected to point F in Stage 2. Inasmuch as Stage 2 is identical with Stage 1, the same reference numerals are used with the addition of the letter "*a*" to each reference numeral. As shown, there may be any number of stages the last of which would be Stage *n*. In Stage *n*, the same reference numerals are used as in Stage 1 but with the addition of the subscript *n* applied thereto.

Figure 2:
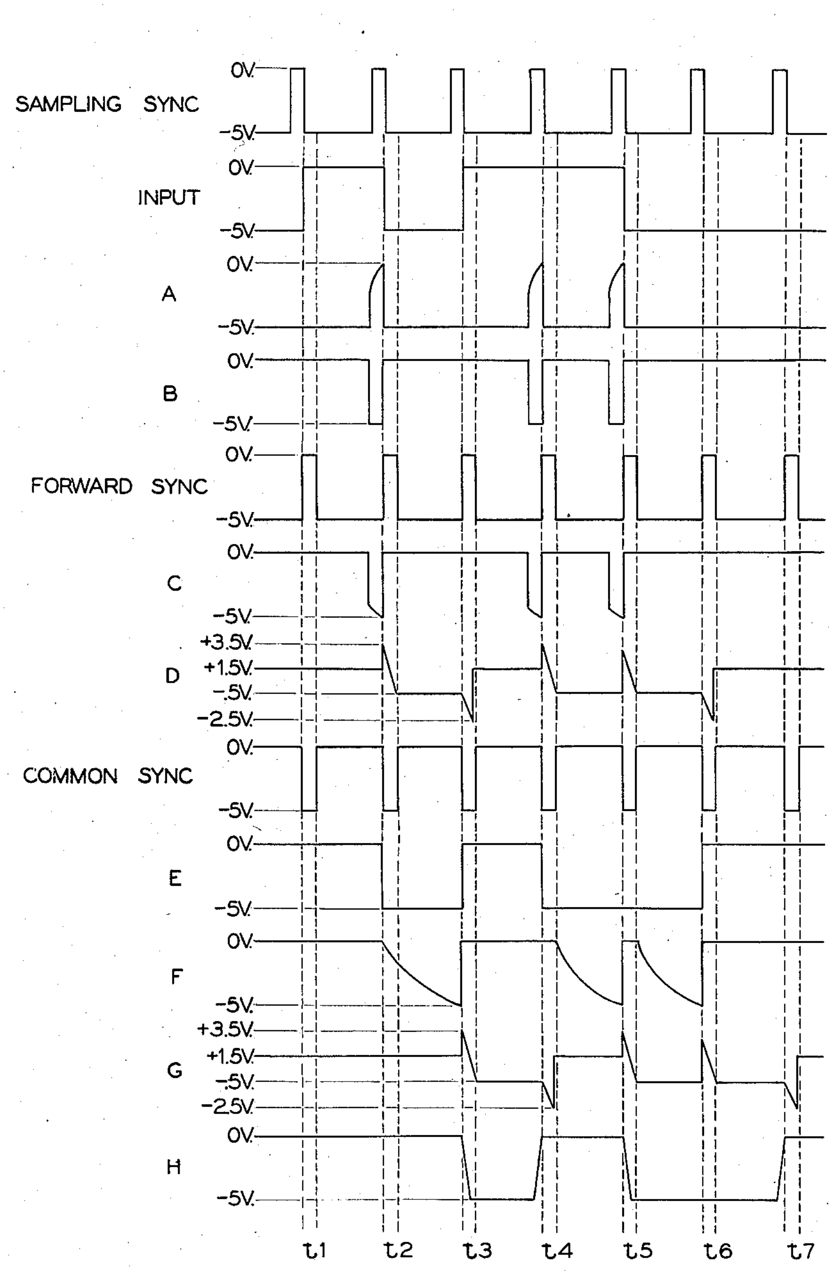
Fig. 2 shows sample waveforms which are produced at various points in Fig. 1.

In order to more fully understand the operation of the present invention as shown in Fig. 1, reference is further made to the waveforms shown in Fig. 2. Each of the waveforms in Fig. 2 is provided with either a name or a letter, these names or letters designating certain points in Fig. 1. As shown the Sampling Sync signal is in the form of a series of positive pulses utilized to sample the Input voltage. The Input voltage is in the form of an envelope voltage having a lower level representing a binary "0" and an upper level representing a binary "1." Due to the fact that the Input waveform will normally be slightly delayed, sampling thereof takes place near the trailing edge. As previously mentioned, the Forward Sync and the Common Sync occur in coincidence but are of opposite polarity. The Forward Sync comprises a plurality of positive pulses having a leading edge in coincidence with the trailing edge of the Sampling Sync pulse. The Common Sync pulses are negative pulses. As shown at time *t2*, a coincidence occurs between the Sampling Sync pulse and the Input signal. This causes a rise in voltage at point A and results in placing transistor 17 in conduction, thereby producing a drop in voltage at point B. It will be noted that transistor 17 conducts only during the Sampling Sync signal. This is of course due to the fact that as soon as the Sampling Sync terminates, there is no longer a relatively positive voltage at point A.

During the time transistor 17 is conducting, point C, which is connected to one side of capacitor 22 will see a relatively low impedance through transistor 17 to the negative D. C. source of potential connected to the emitter of transistor 17. Since point D is connected to the base of transistor 24, which is presently conducting, and is also connected to the cathode of a diode 25, whose plate is connected to the Common Sync line which is relatively positive at this time, point D does not change. This allows capacitor 22 to charge negatively during the period of conduction of transistor 17. Shortly after time *t2*, the Forward Sync and Common Sync pulses are applied to points C and D, respectively. Since the Common Sync line is dropping below the potential that point D is at, no current flows through diode 25. However, as the Forward Sync voltage rises, the voltage at point C also rises and produces a positive going voltage at point D which is connected to the base of transistor 24. Transistor 24 goes out of conduction and supplies a negative going voltage to the base of transistor 26 to place it in conduction, thereby producing a negative going voltage at point E which, by way of resistor 28, causes the emitter of transistor 24 to be biased in a sufficient negative direction to maintain transistor 24 out of conduction. It will be noted that the drop in voltage at point E, as indicated in Fig. 2, causes a drop in voltage at point D, this being due to the fact that resistor 31 connects these two points. Point D is prevented from dropping below ground potential by means of the current flowing from the Common Sync line through diode 25. Thus, a binary "1" has been entered into Stage 1 following time *t2*. During time *t3*, there is not a coincidence between in Input signal and the Sampling Sync signal so that transistor 17 is not allowed to go into conduction during this time. Under these circumstances, point C can only reflect back into a potential which is at approximately ground potential and as a result little or no change takes place at point C during this time. On the other hand, the application of the negative going Common Sync signal to the plate of diode 25 allows point E to drop point D which results in a negative going voltage being applied to the base of transistor 24 so as to turn transistor 24 back into conduction and transistor 26 out of conduction. When transistor 26 goes out of conduction, its emitter voltage as shown at E in Fig. 2 rises to ground.

Between times *t2* and *t3*, transistor 26 was conducting and the side of the capacitor connected to point F was able to look into a relatively low impedance through transistor 26 to its collector potential. Therefore, point F was allowed to drop to the collector potential prior to the time transistor 26 was turned off following time *t3*. When the positive going Forward Sync occurs immediately after time *t3*, point F is driven to ground and causes a positive going voltage to be produced at the base of transistor 24*a* in Fig. 2. This, of course, causes Stage 2 to turn On and have a binary "1" stored therein. Thus, after the operations have been completed following time *t3*, a binary "0" is stored in Stage 1 and a binary "1" is stored in Stage 2.

At time *t4*, there is a coincidence between the Sampling Sync and Input signals which results in transistor 17 being placed in conduction. This allows capacitor 22 to charge negatively so that when the Forward Sync pulse is produced following time *t4*, Stage 1 will be turned On. At the same time, point F, which was connected to the emitter of transistor 26, was not able to drop negatively due to the fact that transistor 26 offered a high impedance path between the collector potential thereof and point F. When the Forward Sync pulse following time *t4* is produced, point F does not rise and does not result in a positive going transient being supplied to the base of transistor 24*a*. However, the Common Sync goes negative immeditely following time *t4* and allows the base of transistor 24*a* to drop as indicated at G in Fig. 2. This results in Stage 2 being turned Off. Thus, after the operations following time *t4* have been completed, Stage 1 is On and Stage 2 is Off.

At time *t5*, there is again a coincidence between the Input and Sampling Sync signals so that capacitor 22 is again allowed to charge negatively by way of transistor 17. At the same time, capacitor 22*a* is allowed to charge negatively by virtue of the fact that Stage 1 was On and transistor 26 was conducting. It will be noted that the voltage at point C rises to ground potential when the Forward Sync pulse occurs following time *t5*. This produces a short spike at point D which is connected to the base of transistor 24. This spike prevents the Common Sync from dropping the voltage at point D, which would place transistor 24 into conduction. Thus, Stage 1 remains On following time *t5*. It is also seen that following time *t4* the voltage at point F was able to drop negatively through transistor 26 in Stage 1. When the Forward Sync pulse was produced following time *t5*, the voltage at point F rises sharply and results in a positive going voltage being applied to the base of transistor 24*a* as indicated at G in Fig. 2. This results in turning Stage 2 On. Thus, following the operation at time *t5*, a binary "1" is stored in Stage 1 and binary "1" is stored in Stage 2.

At time *t6*, there is not a coincidence between the Sampling Sync and Input pulses so that transistor 17 is not turned On. Therefore, when the Common Sync pulse is applied following time *t6* to point D, transistor 24 is placed into conduction so that Stage 1 is placed in an Off condition. However, between times *t5* and *t6*, Stage 1 was On so that capacitor 22*a* was able to charge negatively through transistor 26. Thus, a positive going transient is supplied to the base of transistor 24*a*. Here again, transistor 24*a* is already out of conduction and this positive going pulse is needed to prevent the Common Sync from dropping the voltage at point G.

It is believed that from the above-detailed description that the operation of the circuit shown in Fig. 1 should be apparent.

In order to enter information in parallel into the register shown in Fig. 1, side entry terminals 35, 35*a* and 35*n* are provided and connected to the cathodes of diodes 36, 36*a* and 36*n*, respectively, the plates of these diodes being connected to the base of transistors 26, 26*a* and 26*n*, respectively. When the side entry method of entering information into the register is used, the input sampling circuit 10 is not used. Entry time may be in coincidence with the Sampling Sync pulses. In order to store a binary "1" in Stage 1, for example, a pulse going from ground to −5 volts may be applied to terminal 35. As terminal 35 drops to −5 volts, the base of transistor 26 is dropped sufficiently to allow it to go into conduction. This, of course, causes transistor 24 to go out of conduction. When the following Common Sync and Forward Sync pulses occur, Stage 1 will be turned Off and Stage 2 will be turned On in the manner previously described. Thus, the register may serve as a parallel to serial translator. That is, input information may be entered in parallel at the side entry terminals and thereafter stepped out serially. After the register is emptied of information, it is ready for another parallel entry.

Figure 3:
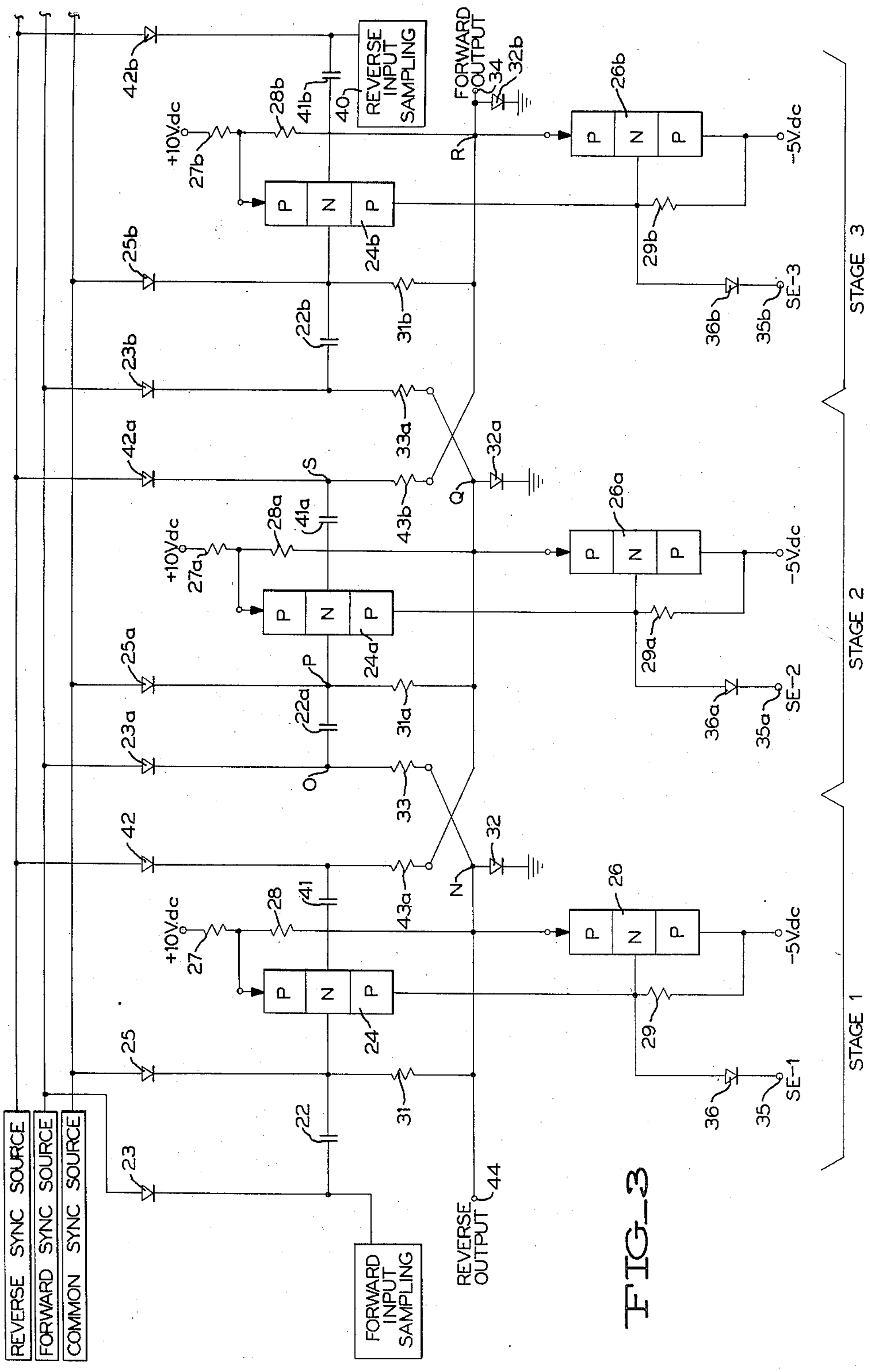
Fig. 3 shows a schematic diagram of a second embodiment of the present invention and illustrates the manner in which either forward or reverse shifting action may take place.

The register shown in Fig. 3 includes the register shown in Fig. 1, but in addition has provision for reverse shifting. Three stages are shown and labeled Stage 1, Stage 2 and Stage 3. Reference numerals are provided on that portion of the register similar to Fig. 1 in the same manner of Fig. 1. A forward input sampling circuit 10, which may be identical with the circuit shown in detail in Fig. 1 and labeled with the same reference numeral, is utilized to supply a serial input to Stage 1. A reverse input sampling circuit 40 is connected to Stage 3, the details of circuit 40 being identical with those shown in circuit 10. Circuit 40 has its output connected to the one side of capacitor 41*b*, the other side of said capacitor being connected to the base of transistor 24*b*. While transistor 24*b* is shown to have two base connections, it will be understood that these terminals are actually connected together. They are shown separately for the sake of clarity in the drawing. A Reverse Sync line is utilized in the Fig. 3 circuit, this line being connected to the plate of a diode 42*b* whose cathode is connected to the said one side of capacitor 41*b*. The emitter of transistor 26*b* is connected by way of a resistor 43*b* to one side of a capacitor 41*a* in Stage 2.

It will be seen from the drawing that Stages 1 and 2 also have the additional capacitor described in relation to Stage 3. Also, the Reverse Sync line is connected to these capacitors in a manner similar to that in which it was connected to capacitor 41*b* in Stage 3. In addition, Stage 2 is also provided with a resistor between the emitter of transistor 26*a* and one side of capacitor 41 in Stage 1, this resistor being provided with reference numeral 43*a*.

As in the Fig. 1 embodiment, the output from the register when shifting in a forward direction appears at terminal 34. The output from the register when shifting in a reverse direction appears at terminal 44 which is connected to the emitter of transistor 26 in Stage 1.

Figure 4:
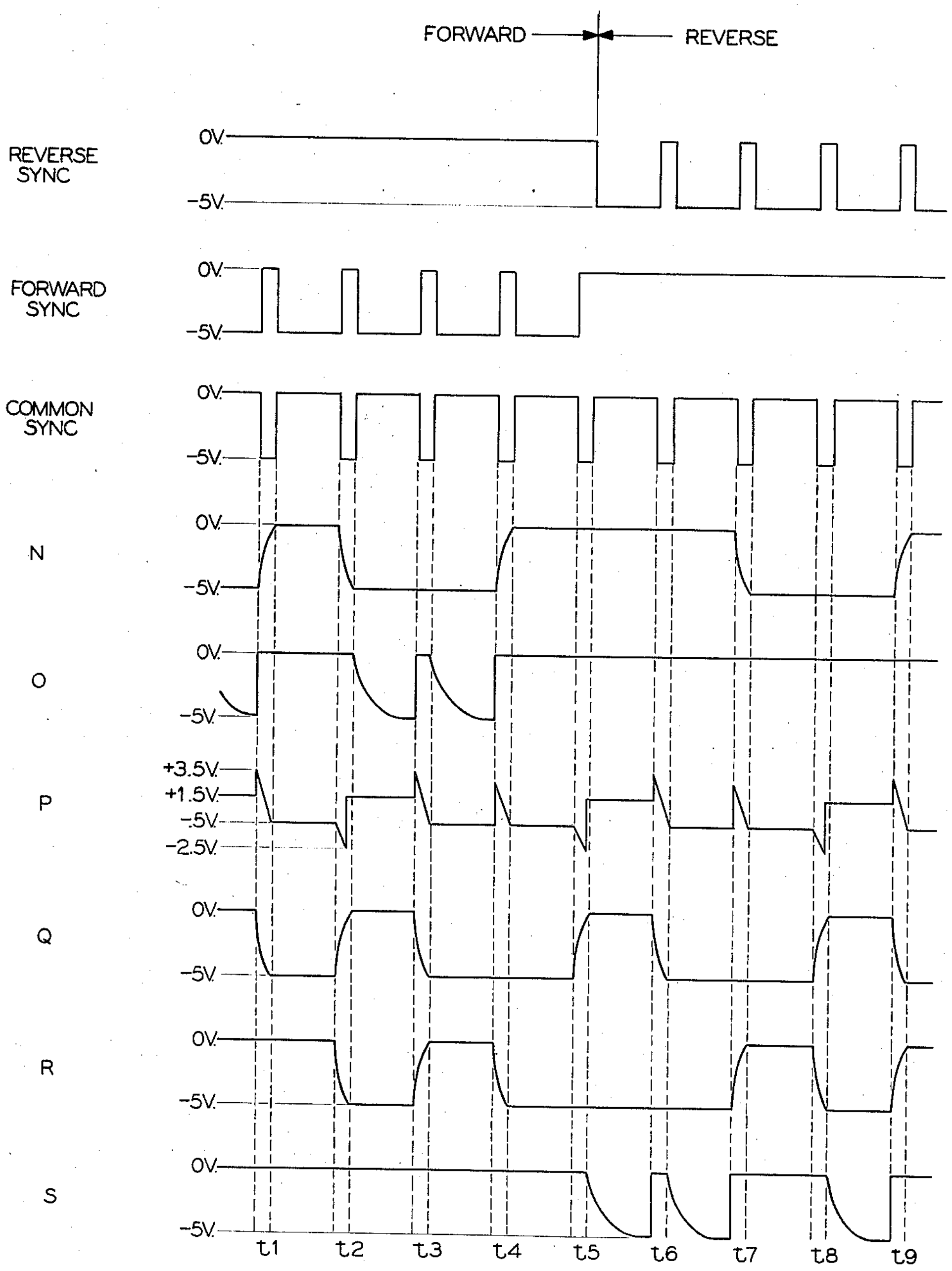
Fig. 4 shows a plurality of sample waveforms which may be produced at various points in the circuit shown in Fig. 3.

The operation of the circuit shown in Fig. 3 should be readily apparent when taken in conjunction with the waveforms shown in Fig. 4. Here again, the waveforms are labeled either with a name or a letter which is identical with a name or a letter shown in Fig. 3. At the top of Fig. 4, the first half of the waveforms is labeled Forward and the second half is labeled Reverse. In shifting in a forward direction, the action of the circuit shown in Fig. 3 is identical with that shown in Fig. 1 and it is believed that a detailed description thereof is unnecessary. It will be noted that during the time when forward shifting of the information in the register is utilized, the Reverse Sync line is held relatively positive, thereby allowing the Forward Sync line to be operative in shifting the information in a forward direction. However, when it is desired to shift the information in a reverse direction, the Forward Sync line is held relatively positive and the Reverse Sync pulses are utilized.

The points labeled N, Q and R in Fig. 3 are connected to the emitters of transistors 26, 26*a* and 26*b*, respectively. The potential at these points as shown in Fig. 4 indicates the condition of the register. As shown at N, the potential at the emitter of transistor 26 is relatively positive, thereby indicating that Stage 1 is Off. The potential shown at Q indicates that Stage 2 is On, while the potential at R indicates that Stage 3 is Off. Following time *t*1, the register has the binary number 010 stored therein. Following time *t*2, it is seen that Stage 1 is turned On, this being due to the fact that a binary "1" has been entered by way of circuit 10. The binary "1" in Stage 2 is shifted to Stage 3 at time *t*2 and the binary "0" in Stage 1 is shifted to Stage 2 during time *t*2. At time *t*3, a binary "1" is entered in Stage 1. It will be seen that Stage 2 goes On to store the binary "1" therein that was in Stage 1 during time *t*2 and Stage 3 goes Off to store the binary "0" therein that was in Stage 1 during time *t*2 and Stage 3 goes Off to store the binary "0" therein that was stored in Stage 2 during time *t*2. During times *t*4 and *t*5, binary "0's" are entered into the register so that at the end of time *t*5, Stages 1 and 2 are Off and Stage 3 is On.

At time *t*6, the Reverse Sync is operative and the Forward Sync is clamped to ground. The voltage at R in Fig. 2 continues to be at approximately −5 volts. This is indicative of the fact that a binary "1" has been entered in Stage 3 by way of circuit 40 at time *t*6. Since the Reverse Sync is now operative, Stage 2 now stores a binary "1" therein which was stored in Stage 3 during time *t*5, and Stage 1 has a binary "0" stored therein which was stored in Stage 2 during time *t*5. It should be apparent that the binary "1" which was entered in Stage 3 during time *t*6 was entered in the same manner that the binary "1" was described as entering Stage 1. With Stage 3 On, capacitor 41*a* in Stage 2 is allowed to charge negatively through resistor 43*b* and transistor 26*b* in Stage 3. When the Reverse Sync pulse occurs at time *t*6, diode 42*a* conducts and supplies a positive going potential by way of capacitor 41*a* to the base of transistor 24*a*, thereby turning Stage 2 On. Since Stage 2 was Off during time *t*5, capacitor 41 was not able to charge negative through resistor 43*a* and transistor 26*a*, this being due to the fact that during time *t*5 transistor 26*a* was not conducting. Thus, when the Reverse Sync pulse occurred at time *t*6, a positive going transient did not appear at the base of transistor 24 in Stage 1. Therefore, Stage 1 remains Off.

Immediately prior to time *t*7, a binary "0" was sampled in circuit 40 and resulted in capacitor 41*b* not being allowed to charge negatively. Therefore, when the Reverse Sync pulse occurred at time *t*7, it was not allowed to conduct through diode 42*b* since the right side of capacitor 41*b* to which it was connected is more positive than the Reverse Sync pulse. However, the Common Sync pulse, which also occurs at time *t*7, is allowed to conduct through diode 25*b* and apply a negative going voltage to the base of transistor 24*b*, thereby turning Stage 3 Off. Immediately prior to time *t*7, capacitor 41*a* was able to charge negatively through resistor 43*b* and transistor 26*b* since Stage 3 is On during time *t*6. Since Stage 2 was already On, it will remain On because the positive going voltage is supplied to the base of transistor 24*a* at time *t*7. Since Stage 2 was On during time *t*6, Stage 1 will remain On during time *t*7.

The remaining times *t*8 and *t*9 see Stage 3 turn On during time *t*8 and Off during time *t*9. Since the Reverse Sync is operative at this time, all of the information in the register will be shifted in the reverse direction.

From the above-detailed description of the present invention, it will be seen that I have provided a new and improved shift register. A high speed of operation is allowed by virtue of the fact that the transistors in each stage are not turned Off every shift time and possibly turned On again by the carry pulse from a preceding stage. Furthermore, the register does not use transistors which are connected in the grounded emitter configuration, thus eliminating the problem of minority carrier storage which is present when such a configuration is used. It has been shown that the shift register is capable of being entered in either direction serially and also by side entry in parallel. The information within the register can be shifted in either a forward direction or a reverse direction at will. The register of this invention has been operated satisfactorily at a frequency of 500 kc. The manner in which a particular stage is able to look back into the preceding stage to determine the condition of the preceding stage prior to the shift time is simple and uses only a minimum of components.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Signal translating apparatus comprising first and second bistable devices, means including a capacitor for coupling said first and second bistable devices together, means connected to one side of said capacitor for applying a first group of pulses thereto, and means connected to the other side of said capacitor for applying a second group of pulses thereto, the pulses in said first and second groups being synchronized with each other and of opposite polarity.

2. Signal translating apparatus comprising first and second bistable devices, each of said devices including first and second signal translating devices, at least one of said signal translating devices being in conduction when said bistable device is in one of its stable states and being out of conduction when said bistable device is in its other stable state, means inculding a capacitor for coupling said first and second bistable devices together, means connecting one side of said capacitor to said one signal translating device in said first bistable device, means connecting the other side of said capacitor to said first signal translating device in said second bistable device, means connected to one side of said capacitor for applying a first train of pulses thereto, and means connected to the other side of said capacitor for applying a second train of pulses thereto, the pulses in said first and second trains of pulses being synchronized with each other and of opposite polarity.

3. Signal translating apparatus comprising first and second bistable devices, each of said devices including first and second signal translating devices, means connecting said first and second signal translating devices in a manner such that said first signal translating device conducts when said bistable device is in one of its stable states and said second signal translating device conducts when said bistable device is in the other of its stable states, a capacitor, means connecting one side of said capacitor to the second signal translating device in said first bistable device, means connecting the other side of said capacitor to the first signal translating device in said second bistable device, means connected to one side of said capacitor for applying a first pulse thereto, and means connected to the other side of said capacitor for applying a second pulse thereto, said first and second pulses being of opposite polarity.

4. Signal translating apparatus comprising first and second bistable devices, each of said devices including first and second signal translating devices, means connecting said first and second signal translating devices in a manner such that said first signal translating device conducts when said bistable device is in one of its stable states and second signal translating device conducts when said bistable device is in the other of its stable states, a capacitor, means connecting one side of said capacitor to the second signal translating device in said first bistable device, means connecting the other side of said capacitor to the first signal translating device in said second bistable device, means connected to one side of said capacitor for applying a first train of pulses thereto, and means connected to the other side of said capacitor for applying a second train of pulses thereto, the pulses in said first and second trains of pulses being synchronized with each other and of opposite polarity.

5. Signal translating apparatus comprising first and second bistable devices, means including a first capacitor for coupling said first and second bistable devices together, means including a second capacitor for coupling said first and second bistable devices together, means connected to one side of said first capacitor for applying a first group of pulses thereto, means connected to the other side of said first capacitor for applying a second group of pulses thereto, means connected to one side of said second capacitor for applying a third group of pulses thereto, means connected to the other side of said second capacitor for applying a fourth group of pulses therto, said fourth group of pulses being synchronized with said second group of pulses and of the same polarity, said first and third groups of pulses occurring at different times and being of a polarity opposite to said second and fourth groups of pulses.

6. Signal translating apparatus comprising first and second bistable means, each of said means including first and second signal translating devices, at least one of said signal translating devices being in conduction when said bistable means is in one of its stable states and being out of conduction when said bistable means is in its other stable state, means including a first capacitor for coupling said one signal translating device in said second bistable means to said first signal translating device in said first bistable means, means including a second capacitor for coupling said one signal translating device in said first bistable means to said first signal translating device in said second bistable means, means connected to one side of said first capacitor for applying a first group of pulses thereto, means connected to the other side of said first capacitor for applying a second group of pulses thereto, means connected to one side of said second capacitor for applying a third group of pulses thereto, means connected to the other side of said second capacitor for applying a fourth group of pulses thereto, said fourth group of pulses being synchronized with said second group of pulses and of the same polarity, said first and third groups of pulses occurring at different times and being of a polarity opposite to said second and fourth groups of pulses.

7. Signal translating apparatus comprising first and second bistable devices, each of said devices including first and second signal translating devices, means connecting said first and second signal translating devices in a manner such that said first signal translating device conducts when said bistable device is in one of its stable states and said second signal translating device conducts when said bistable device is in the other of its stable states, means including a first capacitor for coupling said first and second bistable devices together, means including a second capacitor for coupling said first and second bistable devices together, means connected to one side of said first capacitor for applying a first group of pulses thereto, means connected to the other side of said first capacitor for applying a second group of pulses thereto, means connected to one side of said second capacitor for applying a third group of pulses thereto, means connected to the other side of said second capacitor for applying a fourth group of pulses thereto, said fourth group of pulses being synchronized with said second group of pulses and of the same polarity, said first and third groups of pulses being of a polarity opposite to said second and fourth groups of pulses and occurring at different intervals.

8. A shift register comprising a plurality of stages including a first and a second stage, each of said stages comprising a bistable device having first and second transistors, each of said transistors having a base, an emitter and a collector, each of said bistable devices having first means connecting the emitters of said first and second transistors to a first source of potential, second means connecting the collector of the first transistor and the base of the second transistor to a second source of potential, the collector of said second transistor being connected to a potential different from said first potential, said first and second means being arranged such that said first transistor conducts when said bistable device is in one of its stable states and said second transistor conducts when said bistable device is in the other of its stable states, means including a capacitor for coupling the emitter of said second transistor in said first stage to the base of said first transistor in said second stage, means connected to one side of said capacitor for applying a first train of pulses thereto, and means connected to the other side of said capacitor for applying a second train of pulses thereto, the pulses in said first and second trains of pulses being synchronized with each other and of opposite polarity.

9. A shift register comprising a plurality of stages including a first and a second stage, each of said stages comprising a bistable device having first and second transistors, each of said transistors having a base, an emitter and a collector, each of said bistable devices having first means connecting the emitters of said first and second transistors to a first source of potential, second means connecting the collector of said first transistor and the base of said second transistor to a second source of potential, the collector of said second transistor being connected to a potential different from said first potential, said first and second means being arranged such that said first transistor conducts when said bistable device is in one of its stable states and said second transistor conducts when said bistable device is in the other of its stable states, means including a first capacitor for coupling the emitter of said second transistor in said first stage to the base of said first transistor in said second stage, means including a second capacitor for coupling the emitter of said second transistor in said second stage to the base of said first transistor in said first stage, means connected to one side of said first capacitor for applying a first group of pulses thereto, means connected to the other side of said first capacitor for applying a second group of pulses thereto, means connected to one side of said second capacitor for applying a third group of pulses thereto, means connected to the other side of said second capacitor for applying a fourth group of pulses thereto, said fourth group of pulses being synchronized with said second group of pulses and of the same polarity, said first and third groups of pulses being of a polarity opposite to said second and fourth groups of pulses and occurring at different intervals.

10. A reversible shift register comprising a plurality of stages including at least a first and a second stage, each of which comprises a bistable device having first and second transistors, each of said transistors having a base, an emitter and a collector, each of said bistable devices having first means connecting the emitters of said first and second transistors to a first source of potential, second means connecting the collector of said first transistor and the base of said second transistor to a second source of potential, the collector of said second transistor being connected to a potential different from said first potential, said first and second means being arranged such that said first transistor conducts when said bistable device is in one of its stable states and said second transistor conducts when said bistable device is in the other of its stable states, means including a first capacitor for coupling the emitter of said second transistor in said first stage to the base of said first transistor in said second stage, means including a second capacitor for coupling the emitter of said second transistor in said second stage to the base of said first transistor in said first stage, means connected to one side of said first capacitor for applying forward shifting pulses thereto, means connected to the other side of said first capacitor and one side of said second capacitor for applying common sync pulses thereto, means connected to the other side of said second capacitor for applying reverse shifting pulses thereto, said forward and reverse shifting pulses being operative at different times to shift the information in the register in forward and reverse directions, respectively, said common sync pulses being of a polarity opposite to that of the operative one of said forward and reverse shifting pulses but synchronized therewith.

References Cited in the file of this patent

UNITED STATES PATENTS 2,638,542 Fleming ---------------- May 12, 1953

FOREIGN PATENTS 747,606 Great Britain ----------- Apr. 11, 1956